US008761608B2

(12) United States Patent
Djordjevic et al.

(10) Patent No.: US 8,761,608 B2
(45) Date of Patent: Jun. 24, 2014

(54) CODED MULTIDIMENSIONAL PULSE AMPLITUDE MODULATION FOR ULTRA-HIGH-SPEED OPTICAL TRANSPORT

(75) Inventors: Ivan B. Djordjevic, Tucson, AZ (US); Lei Xu, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 333 days.

(21) Appl. No.: 13/251,218

(22) Filed: Oct. 1, 2011

(65) Prior Publication Data

US 2012/0257896 A1  Oct. 11, 2012

Related U.S. Application Data

(60) Provisional application No. 61/391,720, filed on Oct. 11, 2010.

(51) Int. Cl.
  *H04B 10/524* (2013.01)
(52) U.S. Cl.
  USPC ............................ 398/152; 398/184; 398/205
(58) Field of Classification Search
  USPC .................................. 398/152, 184, 189, 205
  See application file for complete search history.

(56) References Cited

U.S. PATENT DOCUMENTS

| 4,965,858 | A * | 10/1990 | Naito et al. .................. 398/205 |
|---|---|---|---|
| 6,445,476 | B1 * | 9/2002 | Kahn et al. .................. 398/189 |
| 6,490,069 | B1 * | 12/2002 | Kahn et al. .................. 398/183 |
| 7,991,070 | B2 * | 8/2011 | Batshon et al. .............. 375/295 |
| 8,175,466 | B2 * | 5/2012 | Djordjevic et al. ........... 398/202 |
| 8,265,175 | B2 * | 9/2012 | Barsoum et al. .............. 375/259 |
| 8,428,472 | B2 * | 4/2013 | Agazzi ........................... 398/189 |
| 2003/0011854 | A1 * | 1/2003 | Kahn et al. ...................... 359/173 |
| 2003/0039012 | A1 * | 2/2003 | Pezzaniti et al. .............. 359/156 |
| 2003/0180055 | A1 * | 9/2003 | Azadet .......................... 398/183 |
| 2005/0271394 | A1 * | 12/2005 | Whiteaway et al. .......... 398/188 |
| 2006/0135081 | A1 * | 6/2006 | Mysore et al. .................. 455/70 |
| 2006/0193407 | A1 * | 8/2006 | Dibiaso et al. ................ 375/343 |
| 2007/0230599 | A1 * | 10/2007 | Koga et al. ..................... 375/260 |
| 2008/0294968 | A1 * | 11/2008 | Djordjevic et al. ........... 714/801 |
| 2009/0052907 | A1 * | 2/2009 | Batshon et al. ............... 398/182 |
| 2009/0175160 | A1 * | 7/2009 | Iraji et al. ...................... 370/208 |
| 2009/0190673 | A1 * | 7/2009 | Koga et al. ..................... 375/257 |
| 2009/0199065 | A1 * | 8/2009 | Djordjevic et al. ........... 714/752 |
| 2009/0279620 | A1 * | 11/2009 | Schenk .......................... 375/260 |
| 2009/0282314 | A1 * | 11/2009 | Djordjevic et al. ........... 714/755 |
| 2010/0195743 | A1 * | 8/2010 | Barsoum et al. .............. 375/242 |

(Continued)

OTHER PUBLICATIONS

Y. Ma, Q. Yang, Y. Tang, S. Chen and W. Shieh, "1-Tb/s single-channel coherent optical OFDM transmission over 600-km SSMF fiber with subwavelength bandwidth access," Opt. Express 17, 9421-9427 (2009).

(Continued)

*Primary Examiner* — David Payne
*Assistant Examiner* — Tanya Motsinger
(74) *Attorney, Agent, or Firm* — Joseph Kolodka; Akitaka Kimura

(57) ABSTRACT

Systems and methods are disclosed to provide optical communication by using subcarriers as individual bases functions, obtaining signal constellation points of an N-dimensional pulse amplitude modulation (ND-PAM) constellation diagram as an N-dimensional Cartesian product of a one-dimensional PAM; and transmitting the N-dimensional signal constellation point over all N orthogonal subcarriers serving as individual bases functions.

12 Claims, 2 Drawing Sheets

(56) References Cited

U.S. PATENT DOCUMENTS

| | | | |
|---|---|---|---|
| 2010/0232804 A1* | 9/2010 | Djordjevic et al. | 398/152 |
| 2011/0044702 A1* | 2/2011 | Mizuguchi et al. | 398/184 |
| 2011/0141876 A1* | 6/2011 | Kuchi et al. | 370/203 |
| 2011/0249709 A1* | 10/2011 | Shiue et al. | 375/219 |
| 2012/0051452 A1* | 3/2012 | Djordjevic et al. | 375/295 |
| 2012/0147983 A1* | 6/2012 | Barsoum et al. | 375/268 |
| 2012/0207470 A1* | 8/2012 | Djordjevic et al. | 398/44 |

OTHER PUBLICATIONS

Y. Tang and W. Shieh, "Coherent optical OFDM transmission up to 1 Tb/s per channel," J. Lightw. Technol. 27, 3511-3517 (2009).

J. McDonough, "Moving standards to 100 GbE and beyond," IEEE Appl. & Practice 45, 6-9 (2007).

I. B. Djordjevic, M. Arabaci, and L. Minkov, "Next generation FEC for high-capacity communication in optical transport networks" J. Lightw. Technol. 27, 3518-3530 (2009).

H. G. Batshon, I. B. Djordjevic, L. Xu and T. Wang, "Modified hybrid subcarrier/amplitude/ phase/polarization LDPC-coded modulation for 400 Gb/s optical transmission and beyond," Opt. Express 18, 14108-14113 (2010).

H. G. Batshon, I. B. Djordjevic, T. Schmidt, "Ultra high speed optical transmission using subcarrier-multiplexed four-dimensional LDPC-coded modulation," Opt. Express 18, 20546-20551 (2010).

H. G. Batshon, I. B. Djordjevic, L. Xu and T. Wang, "Multidimensional LDPC-coded modulation for beyond 400 Gb/s per wavelength transmission," IEEE Photon. Technol. Lett. 21, 1139-1141 (2009).

* cited by examiner

CODED MULTIDIMENSIONAL PULSE AMPLITUDE MODULATION FOR ULTRA-HIGH-SPEED OPTICAL TRANSPORT

This application claims priority to provisional Ser. No. 61/391,720 filed Oct. 11, 2010, the content of which is incorporated by reference.

BACKGROUND

The present invention relates to ultra-high speed optical transport systems. The optical communication systems have been rapidly evolving recently in order to meet continuously increasing demands on transmission capacity, originating mostly from the Internet and multimedia applications. In order to satisfy high capacity demands, according to some industry experts, the 1 TbE standards is needed. Coherent optical OFDM is one possible pathway towards achieving beyond 1 Tb/s optical transport. Initial studies, unfortunately, indicate that the system Q-factor when multiband OFDM with orthogonal sub-bands is used is low, about 13.2 dB after 1000 km of SMF, which represents a very tight margin in terms of 7% overhead for RS(255,239) code, unless strong LDPC codes are used. Another approach is based on multidimensional coded modulation. Namely, by increasing the number of dimensions (i.e., the number of orthonormal basis functions), the aggregate data rate of the system can be increased without degrading the bit error rate (BER) performance as long as orthogonality among basis functions is preserved. Conventional approaches on multidimensional signal constellations for optical communications so far have been related to single carrier systems.

SUMMARY

Systems and methods are disclosed to provide optical communication by using subcarriers as individual bases functions, obtaining signal constellation points of an N-dimensional pulse amplitude modulation (ND-PAM) constellation diagram as an N-dimensional Cartesian product of a one-dimensional PAM; and transmitting the N-dimensional signal constellation point over all N orthogonal subcarriers serving as individual bases functions.

The multidimensional coded modulation approach can be applied to multicarrier systems. The ND-PAM in analogy to QAM that can be considered as generalization of 1D-PAM. The scheme can also be considered as a generalization OFDM. In ND-PAM scheme, the orthogonal subcarriers are used as bases functions, and the signal constellation points of corresponding ND-PAM constellation diagram are obtained as N-dimensional Cartesian product of one-dimensional PAM. In conventional OFDM, QAM/PSK signal constellation points are transmitted over orthogonal subcarriers and then multiplexed together in an OFDM stream. Individual subcarriers therefore carry N parallel QAM/PSK streams. In ND-PAM instead, the N-dimensional signal constellation point is transmitted over all N subcarriers, which serve as individual bases functions. Even if some of the subcarriers are severely affected by channel distortion, the overall signal constellation point will face only small distortion, when strong channel capacity achieving channel codes are used. In addition, because the channel capacity is a logarithmic function of SNR but a linear function of number of dimensions, the spectral efficiency of optical transmission systems can dramatically be improved with the preferred embodiment. The complexity of corresponding symbol log-likelihood ratios (LLRs) block increases with number of dimensions, and it is clear that in practice 3-7 dimensions should be used. We further describe the frequency-interleaved scheme that properly combines subsystems with reasonable number of dimensions (3-5) into a system with multi-Tb/s serial aggregate data rate.

Advantages of the preferred embodiments may include one or more of the following. The system improves dramatically OSNR sensitivity by using ND signal constellations instead of conventional 2D constellations (QAM or PSK). Additionally, because the N-dimensional signal constellation point is transmitted over all N subcarriers, even if some of the subcarriers are severely affected by channel distortion, the overall signal constellation point will face only small distortion, when strong channel capacity achieving channel codes are used. Therefore, the system has several additional advantages compared to signal carrier, such as excellent chromatic dispersion, PMD and PDL tolerance. With the system, transmission distances beyond 2000 km at ultra-high spectral efficiency ($\geq 10$ bits/s/Hz) are possible. In combination with quasi-cyclic LDPC codes of large girth, the system can achieve beyond multi-Tb/s serial optical transmission for long-haul applications.

DESCRIPTION

Figure 1:
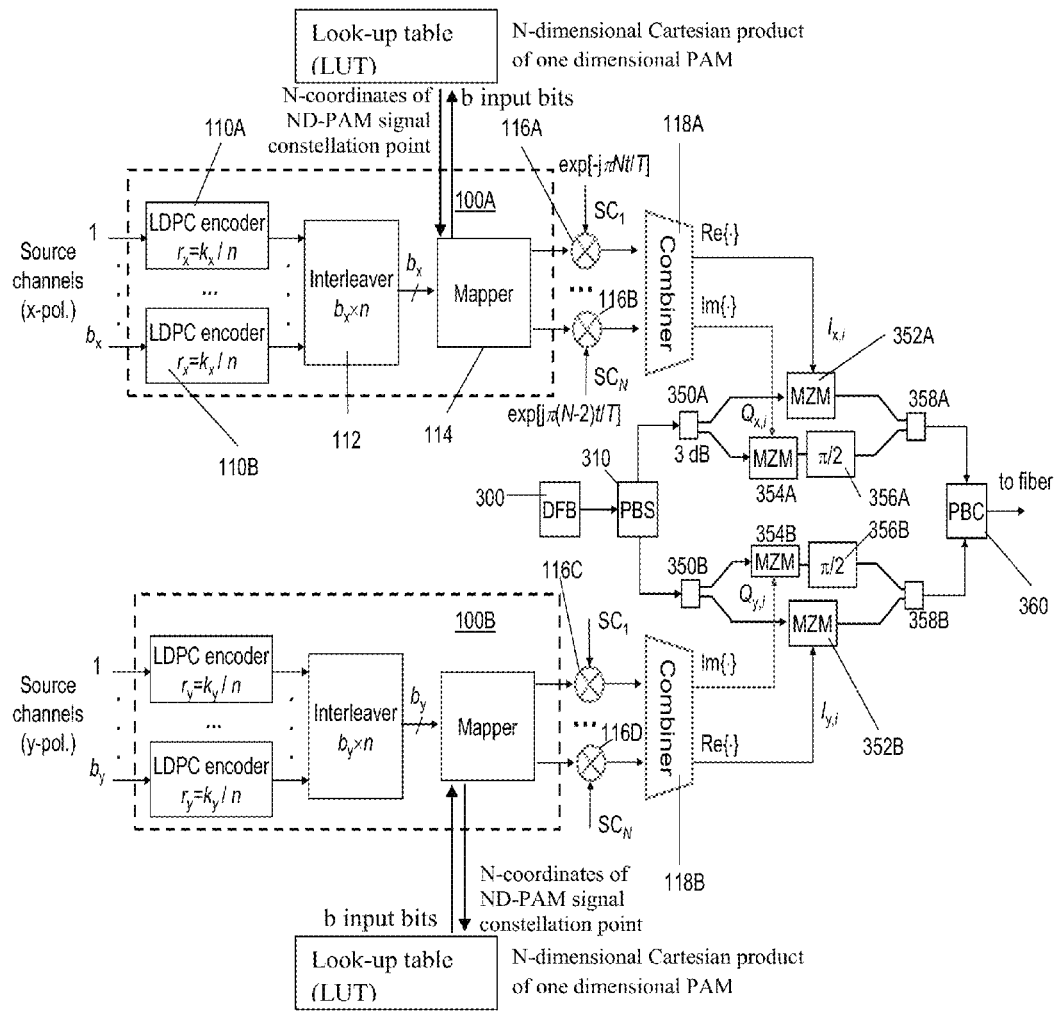
FIG. 1 shows one exemplary 4D LDPC-coded N-dimensional pulse amplitude modulation (ND-PAM) optical OFDM system.

One exemplary 4D LDPC-coded N-dimensional pulse amplitude modulation (ND-PAM) optical OFDM system is shown in FIG. 1. The scheme used in FIG. 1 can be considered as a generalization of PAM to N-dimensions as well as a generalization of OFDM. In this scheme, the orthogonal subcarriers are used as bases functions, and the signal constellation points of corresponding ND-PAM constellation diagram are obtained as N-dimensional Cartesian product of one-dimensional PAM. In conventional OFDM, QAM/PSK signal constellation points are transmitted over orthogonal subcarriers and then multiplexed together in an OFDM stream. Individual subcarriers therefore carry N parallel QAM/PSK streams. In proposed ND-PAM instead, the N-dimensional signal constellation point is transmitted over all N subcarriers, which serve as individual bases functions. Even if some of the subcarriers are severely affected by channel distortion, the overall signal constellation point will face only small distortion, when strong channel capacity achieving channel codes are used. In addition, because the channel capacity is a logarithmic function of SNR but a linear function of number of dimensions, the spectral efficiency of optical transmission systems can dramatically be improved with proposed scheme.

Turning now to FIG. 1, in block 100A, data from a plurality of sources corresponding to x-polarization are fed to corresponding LDPC encoders 100A-100B. The output of the LDPC encoders 100A-100B are provided to a bit interleaver 112, which drives a mapper 114. ND symbols are imposed on different orthogonal subcarriers 116A-116B and combined into a signal stream by combiner 118A. The combiner outputs, corresponding to real and imaginary parts, are provided to an in-phase/quadrature (I/Q) modulator, composed of two Mach-Zehnder modulators (MZMs) 352A and 352B, and one $\pi/2$ phase shifter 356A in Q-branch of I/Q modulator. In FIG.

1A, a distributed feedback laser DFB 300 is used as lightwave source, connected to a PBS (polarization beam splitter) 310, which is used to split two orthogonal polarizations. The x-(y-) polarization signal is further split by a 3 dB coupler 350A (350B), and each of two outputs are used to impose real and imaginary parts of combiner 118A (118B). After imposing the real and imaginary parts in MZMs 352A and 352B, the corresponding optical streams are combined into a single stream by a 3 dB coupler 358A. The $\pi/3$ phase shift introduced in 356A is needed to ensure the orthogonality of corresponding real and imaginary signals. A similar operation is applied to y-polarization source channels. The x- and y-polarization signals are combined into a signal stream by a polarization beam combiner 360.

Figure 2:
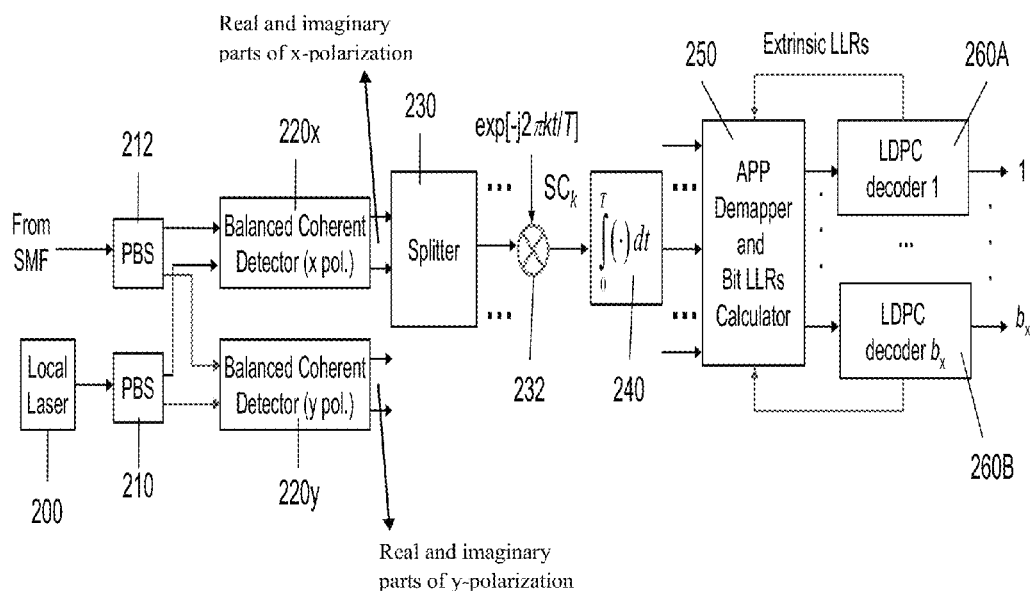
FIG. 2 shows another exemplary ND-PAM optical OFDM receiving system.

Referring now to FIG. 2, one exemplary ND-PAM optical OFDM receiving system is shown. In the receiver, a local laser 200 drives a PBS 210. Data stream from the SMF is provided to a PBS 212. The x-polarizations of PBS 210 and PBS 212 are provided to the balanced coherent detector 220$x$, while the y-poalrizations are used as inputs of the balanced coherent detector 220$y$. The balanced coherent detector 220$x$ (220$y$) provide the imaginary and real parts of x-polarization (y-polarization) signal imposed on transmitter side. Next, a splitter 230 splits the complex data stream in either polarization into N streams that are used as inputs to the kth (k=1, 2, ..., N) subcarrier demodulator 232, which provides the projection along the kth subcarrier. The product demodulator 232 output drives an integrator 240. The product demodulator and integrator serve as a correlation receiver of kth subcarrier. Alternatively, the corresponding mached filter can be used. The projections along subcarriers (equivalently ND constellation coordinate estimates) are then processed by an APP (a posteriori probability) demapper and Bit LLR (log-likelihood ratio) calculator 250, whose outputs are provided to a plurality of LDPC decoders 260A-260B.

The LDPC-coded ND-PAM system, which is obtained as N-dimensional generalization of PAM with L constellation points, is shown in FIGS. 1 and 2. The ND-PAM signal constellation is obtained as N-dimensional Cartesian product of one dimensional PAM signal constellation. The 1D-PAM is described with the following amplitude signal constellation points X={(2i−1−L)d, i=1, 2, ..., L}, where 2d is the Euclidean distance between two neighboring points. The ND-PAM is therefore obtained as $$X^N = \underbrace{X \times X \times \ldots \times X}_{N\ times} = \{(x_1, x_2, \ldots, x_N) | x_i \in X, \forall\ 1 \le i \le N\}. \quad (1)$$

For example, for L=4 and N=3 the corresponding constellation diagram is given by $X^3 = X \times X \times X = \{(x_1, x_2, x_3) | x_i \in X = \{-3, -1, 1, 3\}, \forall\ 1 \le i \le 3\}$. The number of constellation points in ND-PAM is determined by $M = L^N$, while the number of bits per symbol is $b = \log_2(L^N)$. The b independent data streams are encoded using an LDPC (n,k) code of rate r=k/n, where n denotes the codeword length and k is the information word length. The codewords are written row-wise into b×n bit interleaver. The b bits are taken from bit interleaver column-wise at every symbol slot i and are used as input of ND mapper, which selects one constellation point out of $L^N$, depending on information content. The ND mapper is implemented as a look-up table (LUT) with b input bits serving as a memory address that selects the N-coordinates of ND-PAM signal constellation point. For example, the LUT for L=4 and N=3 ($4^3$-3D-PAM) is shown in Table 1. The kth coordinate is multiplied by $\exp[j2\pi kt/T]$ (k=−N/2, ..., N/2−1). Therefore, the coordinates are imposed on orthogonal subcarriers. The coordinates, upon multiplication with $\exp[j2\pi kt/T]$, are added in combiner block that provides the real and imaginary parts of such obtained signal to be used as in-phase and quadrature signals for corresponding Mach-Zehnder modulators (MZMs) as shown in FIG. 1. Similar architectures are used for x- and y-polarization channels. The signals at the output of I/Q modulators are combined into single stream via polarization-beam splitter (PBS), as shown in FIG. 1. The aggregate data rate of this scheme is $2rbR_s$, where $R_s$ is the symbol rate. For example, by setting L=4, N=4 and $R_s$=31.25 Giga symbols/s (GS/s), the aggregate data rate is 400 Gb/s, which is compatible with 400 G Ethernet. If we increase the number of dimensions to N=10 while keeping all other parameters the same, the aggregate data rate is 1 Tb/s, which is compatible with 1 Tb/s Ethernet.

TABLE 1

Mapping rule look-up table for $4^3$-3D-PAM.

| Interleaver output | Signal constellation coordinates |
|---|---|
| 0 0 0 0 0 0 | {−3, −3, −3} |
| 1 0 0 0 0 0 | {−3, −3, −1} |
| 0 1 0 0 0 0 | {−3, −3, 1} |
| 1 1 0 0 0 0 | {−3, −3, 3} |
| 0 0 1 0 0 0 | {−3, −1, −3} |
| 1 0 1 0 0 0 | {−3, −1, −1} |
| 0 1 1 0 0 0 | {−3, −1, 1} |
| 1 1 1 0 0 0 | {−3, −1, 3} |
| 0 0 0 1 0 0 | {−3, 1, −3} |
| 1 0 0 1 0 0 | {−3, 1, −1} |
| 0 1 0 1 0 0 | {−3, 1, 1} |
| 1 1 0 1 0 0 | {−3, 1, 3} |
| 0 0 1 1 0 0 | {−3, 3, −3} |
| 1 0 1 1 0 0 | {−3, 3, −1} |
| 0 1 1 1 0 0 | {−3, 3, 1} |
| 1 1 1 1 0 0 | {−3, 3, 3} |
| 0 0 0 0 1 0 | {−1, −3, −3} |
| 1 0 0 0 1 0 | {−1, −3, −1} |
| 0 1 0 0 1 0 | {−1, −3, 1} |
| 1 1 0 0 1 0 | {−1, −3, 3} |
| 0 0 1 0 1 0 | {−1, −1, −3} |
| 1 0 1 0 1 0 | {−1, −1, −1} |
| 0 1 1 0 1 0 | {−1, −1, 1} |
| 1 1 1 0 1 0 | {−1, −1, 3} |
| 0 0 0 1 1 0 | {−1, 1, −3} |
| 1 0 0 1 1 0 | {−1, 1, −1} |
| 0 1 0 1 1 0 | {−1, 1, 1} |
| 1 1 0 1 1 0 | {−1, 1, 3} |
| 0 0 1 1 1 0 | {−1, 3, −3} |
| 1 0 1 1 1 0 | {−1, 3, −1} |
| 0 1 1 1 1 0 | {−1, 3, 1} |
| 1 1 1 1 1 0 | {−1, 3, 3} |
| 0 0 0 0 0 1 | {1, −3, −3} |
| 1 0 0 0 0 1 | {1, −3, −1} |
| 0 1 0 0 0 1 | {1, −3, 1} |
| 1 1 0 0 0 1 | {1, −3, 3} |
| 0 0 1 0 0 1 | {1, −1, −3} |
| 1 0 1 0 0 1 | {1, −1, −1} |
| 0 1 1 0 0 1 | {1, −1, 1} |
| 1 1 1 0 0 1 | {1, −1, 3} |
| 0 0 0 1 0 1 | {1, 1, −3} |
| 1 0 0 1 0 1 | {1, 1, −1} |
| 0 1 0 1 0 1 | {1, 1, 1} |
| 1 1 0 1 0 1 | {1, 1, 3} |
| 0 0 1 1 0 1 | {1, 3, −3} |
| 1 0 1 1 0 1 | {1, 3, −1} |
| 0 1 1 1 0 1 | {1, 3, 1} |
| 1 1 1 1 0 1 | {1, 3, 3} |
| 0 0 0 0 1 1 | {3, −3, −3} |
| 1 0 0 0 1 1 | {3, −3, −1} |
| 0 1 0 0 1 1 | {3, −3, 1} |
| 1 1 0 0 1 1 | {3, −3, 3} |
| 0 0 1 0 1 1 | {3, −1, −3} |

TABLE 1-continued

Mapping rule look-up table for $4^3$-3D-PAM.

| Interleaver output | Signal constellation coordinates |
|---|---|
| 1 0 1 0 1 1 | {3, −1, −1} |
| 0 1 1 0 1 1 | {3, −1, 1} |
| 1 1 1 0 1 1 | {3, −1, 3} |
| 0 0 0 1 1 1 | {3, 1, −3} |
| 1 0 0 1 1 1 | {3, 1, −1} |
| 0 1 0 1 1 1 | {3, 1, 1} |
| 1 1 0 1 1 1 | {3, 1, 3} |
| 0 0 1 1 1 1 | {3, 3, −3} |
| 1 0 1 1 1 1 | {3, 3, −1} |
| 0 1 1 1 1 1 | {3, 3, 1} |
| 1 1 1 1 1 1 | {3, 3, 3} |

At the receiver side, and using the polarization beam splitter (PBS), the optical signal is split into two orthogonal polarizations that are used as input into two balanced coherent detectors. The balanced coherent detector outputs are after sampling used as real and imaginary parts of complex sequence stream, which is further split into N-branches as shown in FIG. 2. The kth branch determines the projection along kth coordinate. The projections are used as input of an a posteriori probability (APP) demapper, in which symbol log-likelihood ratios (LLRs) are calculated according to the following equation $$\lambda(S_i) = \log [P(S_i = S_0 | R_i) / P(S_i \neq S_0 | R_i)], \quad (1)$$

where $P(S_i | R_i)$ is determined by Bayes' rule as:

$$P(S_i | R_i) = P(R_i | S_i) P(S_i) \Big/ \sum_{S'} P(R_i | S'_i) P(S'_i). \quad (2)$$

The bit LLRs calculator, on the other hand, calculates the bit LLRs to be used in LDPC decoding from the symbol LLRs as follows $$L(\hat{v}_j) = \log \left[ \sum_{S_i : v_j = 0} \exp(\lambda(S_i)) \Big/ \sum_{S_i : v_j = 1} \exp(\lambda(S_i)) \right]. \quad (3)$$

In the above equations $s_i$ denotes the transmitted signal constellation point, $R_i$ denotes the received constellation point, where $s_0$ denotes the referent constellation point. $P(R_i | S_i)$ denotes the conditional probability that can be estimated by collection of histograms. In quasi-linear regime, the Gaussian approximation can be used. P(S) denotes a priori probability of symbol S, while $\hat{v}_j$ (j∈{0, 1, ..., n−1}) is the jth bit estimate of the codeword v. The bit LLRs are forwarded to LDPC decoders, which provide extrinsic bit LLRs for demapper and are used as inputs to (2) as prior information.

The difference of preferred embodiment compared to OFDM is that a given signal constellation point is transmitted over all subcarriers simultaneously. On the other hand, in OFDM different MPSK/QAM sequences are used on different subcarriers and then multiplexed together in a single OFDM symbol. If a particular subcarrier is severely affected by channel distortion the information symbol will be lost. In the preferred embodiment, however, only one particular coordinate will be affected. Therefore, the preferred embodiment will be much more efficient in dealing with various channel distortions. In addition, the preferred embodiment employs the N-dimensional signal constellations, while in OFDM only 2D signal constellations are used. For the same symbol energy, the Euclidean distance between signal constellation points is much larger in N-dimensional space (N≥3) than in 2D one resulting in much better OSNR sensitivity as shown later.

Next, a frequency interleaving/deinterleaving process for enabling beyond multi-Tb/s Ethernet based on ND-PAM is discussed. In theory, the aggregate data rate can be increased by simply increasing the number of subcarriers as long as the orthogonality among subcarriers is preserved. However, the complexity of APP demapper increases with N. To keep the complexity of APP demapper reasonably low, one embodiment first splits the total number of subcarriers $N_{sc} = N^2$ into N subgroups of N subcarriers. Next, the kth group of subcarriers (k=1, ..., N) to be used in the N-dimensional signal constellation is formed by taking each kth element of all subgroups. Finally, the system performs encoding, modulation, transmission, demodulation, decoding on all groups. Thus, if several subcarriers (coordinates) are affected by channel distortion they will belong to different constellation points and system will be more immune to channel distortion compared to conventional OFDM. By using a sufficiently high dimensionality of signal constellations (N≥3), the OSNR improvement advantage will still be preserved.

The LDPC-coded ND-PAM provides a strong response to continuously increasing demands on transmission capacity. The scheme can be considered as a generalization of both PAM and OFDM. In this scheme, the orthogonal subcarriers are used as bases functions, and the signal constellation points of corresponding ND-PAM constellation diagram are obtained as N-dimensional Cartesian product of one-dimensional PAM. Advantages of the system can be that the ND-PAM is highly immune to PMD, residual chromatic dispersion and fiber nonlinearities, as compared to conventional single-/multi-carrier systems. Even if some of the subcarriers are severely affected by channel distortion, the overall signal constellation point will face only a small distortion when strong channel capacity achieving channel codes are used. In addition, because the channel capacity is a logarithmic function of SNR but a linear function of number of dimensions, the spectral efficiency of optical transmission systems can dramatically be improved with the system. This scheme allows the system to be the next generations, both 400 Gb/s and 1 Tb/s, Ethernet enabling technology.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. An optical communication method, comprising:
   using subcarriers as individual bases functions, obtaining signal constellation points of an N-dimensional pulse amplitude modulation (ND-PAM) constellation diagram as an N-dimensional Cartesian product of a one-dimensional PAM; and
   transmitting the N-dimensional signal constellation point over all N orthogonal subcarriers serving as individual bases functions;
   comprising receiving the ND-PAM signals;

comprising splitting the ND-PAM signals into two orthogonal polarizations that are used as input into two coherent detectors;

comprising using the coherent detector outputs as real and imaginary parts of a complex sequence stream;

comprising splitting the stream into N-branches, where a kth branch determines projection along a kth coordinate; and comprising using the projections in a posteriori probability (APP) demapper.

2. The method of claim 1, wherein the one dimensional PAM comprises amplitude signal constellation points $X=\{(2i-1-L)d, i=1, 2, \ldots, L\}$, wherein 2d is a Euclidean distance between two neighboring points and L is the number of constellation points in one dimensional PAM, and wherein the ND-PAM comprises $$X^N = \underbrace{X \times X \times \ldots \times X}_{N \text{ times}} = \{(x_1, x_2, \ldots, x_N) \mid x_i \in X, \forall\, 1 \le i \le N\}.$$

3. The method of claim 1, comprising encoding b independent data streams using an LDPC (n,k) code of rate r=k/n, where n denotes a codeword length and k is an information word length.

4. The method of claim 3, comprising writing codewords row-wise into a b×n bit interleaver.

5. The method of claim 4, wherein the number of constellation points in ND-PAM is determined by $M=L^N$ where L is the number of constellation points in one dimensional PAM, and the number of bits per symbol is $b=\log_2(L^N)$, comprising taking codeword bits from the bit interleaver column-wise at every symbol slot i and provided to an ND mapper to select one constellation point out of $L^N$, depending on information content.

6. The method of claim 1, comprising performing an N-dimensional mapper as a look-up table (LUT) with b input bits serving as a memory address that selects the N-coordinates of an ND-PAM signal constellation point.

7. The method of claim 1, comprising imposing coordinates on orthogonal subcarrier, wherein a kth coordinate is multiplied by $\exp[j2\pi kt/T]$ (k=-N/2, ...,N/2-1) where t denotes time and T denotes a period.

8. The method of claim 7, comprising adding all coordinates, upon multiplication with $\exp[j2\pi kt/T]$, to provide real and imaginary parts of a signal used as in-phase and quadrature signals for Mach-Zehnder modulators (MZMs).

9. The method of claim 8, comprising combining signals at the output of I/Q modulators into single stream with a polarization-beam splitter (PBS).

10. The method of claim 1, comprising determining symbol log-likelihood ratios (LLRs) as $$\lambda(S_i) = \log\,[P(S_i S_0|R_i)/Pi=(S_i \ne S_0|R_i)],$$

where $P(S_i|R_i)$ is determined by Bayes' rule as:

$$P(S_i \mid R_i) = P(R_i \mid S_i)P(S_i) \Big/ \sum_{S'} P(R_i \mid S'_i)P(S'_i).$$

11. The method of claim 1, comprising determining bit LLRs to be used in LDPC decoding as:

$$L(\hat{v}_j) = \log\left[\sum_{S_i : v_j=0} \exp(\lambda(S_i)) \Big/ \sum_{S_i : v_j=1} \exp(\lambda(S_i))\right]$$

where $s_i$ denotes a transmitted signal constellation point, $R_i$ denotes a received) constellation point, where so denotes a referent constellation point, and $P(R_i|S_i)$ denotes a conditional probability estimated by collection of histograms., P(s) denotes a priori probability of symbol S, while $\hat{v}_j$ (j∈{0, 1, ..., n−1}) is the jth bit estimate of a codeword v.

12. The method of claim 11, where the bit LLRs are forwarded to LDPC decoders to provide extrinsic bit LLRs for demapping.

* * * * *